US011952241B2

(12) United States Patent
Leger et al.

(10) Patent No.: US 11,952,241 B2
(45) Date of Patent: Apr. 9, 2024

(54) ELEVATOR COUNTERWEIGHT

(71) Applicant: Otis Elevator Company, Farmington, CT (US)

(72) Inventors: Hugues Leger, Saint Alban de Roche (FR); Franck J. Det, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/968,183

(22) Filed: Oct. 18, 2022

(65) Prior Publication Data

US 2023/0242378 A1 Aug. 3, 2023

(30) Foreign Application Priority Data

Jan. 28, 2022 (EP) .................................... 22305094

(51) Int. Cl.

| | |
|---|---|
| ***B66B 17/12*** | (2006.01) |
| ***B66B 1/28*** | (2006.01) |
| ***B66B 1/34*** | (2006.01) |
| ***B66B 11/00*** | (2006.01) |
| *B66B 5/00* | (2006.01) |

(52) U.S. Cl.

CPC ................ *B66B 17/12* (2013.01); *B66B 1/28* (2013.01); *B66B 1/3476* (2013.01); *B66B 11/006* (2013.01); *B66B 5/0006* (2013.01)

(58) Field of Classification Search

CPC B66B 5/0031; B66B 9/00; B66B 5/02; B66B 5/0018; B66B 1/28; B66B 1/3476; B66B 7/1215; B66B 1/30; B66B 1/3446; B66B 7/10; B66B 11/08; B66B 5/0012; B66B 5/0006; B66B 11/008; B66B 17/12; B66B 7/068; B66B 2201/215; B66B 2201/402; B66B 11/009; B66B 11/0035; B66B 11/0055; B66B 11/0273; B66B 11/007; B66B 11/003; B66B 7/1284

See application file for complete search history.

(56) References Cited

U.S. PATENT DOCUMENTS

2023/0242378 A1* 8/2023 Leger ........................ B66B 1/28
187/393

FOREIGN PATENT DOCUMENTS

| | | | | |
|---|---|---|---|---|
| CN | 101979302 A | | 2/2011 | |
| CN | 106865394 A | * | 6/2017 | |
| CN | 108609466 A | * | 10/2018 | ............. B66B 17/12 |
| CN | 109678037 A | * | 4/2019 | ............... B66B 1/06 |

(Continued)

OTHER PUBLICATIONS

European Search Report for application EP 22305094.9, dated Jul. 18, 2022, 64 pages.

*Primary Examiner* — Marlon T Fletcher

(74) *Attorney, Agent, or Firm* — CANTOR COLBURN LLP

(57) ABSTRACT

An elevator counterweight (2) includes a first part (4). The first part (4) is configured to be connected, in use, to a suspension member (8) of an elevator system (1). The first part (4) is arranged to receive an additional mass (6) when the first part (4) is connected to the suspension member (8), such that a mass of the elevator counterweight (2) can be varied. A controller (14) may be arranged to control a mass variation system (12) to vary the mass of the elevator counterweight (2) according to a schedule. The controller (14) may determine the schedule in a learning process.

14 Claims, 10 Drawing Sheets

(56) References Cited

FOREIGN PATENT DOCUMENTS

| | | | | | |
|---|---|---|---|---|---|
| CN | 209668587 | U | * | 11/2019 | ............... B66B 1/06 |
| GB | 2541725 | A | * | 3/2017 | ....... A63B 21/00058 |
| JP | H0725568 | A | | 1/1995 | |
| JP | WO2004074157 | A1 | * | 6/2006 | |
| JP | WO2007020674 | A1 | * | 2/2009 | |
| WO | 9200787 | A1 | | 1/1992 | |
| WO | WO-2011005067 | A1 | * | 1/2011 | ............... B66B 1/30 |

* cited by examiner

ELEVATOR COUNTERWEIGHT

FOREIGN PRIORITY

This application claims priority to European Patent Application No. 22305094.9, filed Jan. 28, 2022, and all the benefits accruing therefrom under 35 U.S.C. § 119, the contents of which in its entirety are herein incorporated by reference.

TECHNICAL FIELD

This disclosure relates to an elevator counterweight and an elevator system comprising an elevator counterweight.

BACKGROUND

It is known to provide an elevator counterweight within an elevator system, to counter the load of the elevator car, so that the motor effectively lifts much less of the elevator car's mass. It is known to provide an elevator counterweight with a fixed mass, where the chosen fixed mass is determined as laid out below.

Where the duty load DL of the elevator car is the maximum load $M_{LoadMax}$ permitted in the elevator car:

$$DL=M_{LoadMax}$$

The fixed mass of the elevator counterweight is selected based on the duty load of the particular elevator car. In particular, the fixed mass $M_{CWT}$ is chosen to be approximately equal to the mass of the elevator car (empty) $M_{CAR}$ plus half of the duty load DL of the elevator car:

$$M_{CWT} = M_{CAR} + \frac{1}{2}DL$$

This gives a torque $C_m$ on the motor of the elevator system of:

$$C_m = \frac{1}{2}\cdot r\cdot g\left[M_{Load} - \frac{1}{2}DL\right]$$

where r is the radius of the motor output sheave, g is the acceleration due to gravity and $M_{Load}$ is the mass of the load in the elevator car (e.g. due to persons or cargo). Note that the factor ½ at the beginning of this equation is for a 2:1 roping arrangement and is not present in a 1:1 roping arrangement.

Since a mass equal to the mass $M_{CAR}$ is present on either side of the motor, these masses balance and therefore the torque acting on the elevator motor is based on the difference between the mass of the load in the elevator car $M_{Load}$, and the additional mass of the elevator counterweight (in addition to the mass of the car), which in this case is chosen to be ½ DL. Thus, the described elevator system is optimised for the case where the elevator car transports a load which has a mass $M_{Load}$ equal to half the duty load DL. However, where the transported load is much lower there will be a large torque acting on the motor, caused by the mass of the elevator counterweight, leading to wasted energy consumption and high wear in the motor.

SUMMARY

According to a first aspect of this disclosure there is provided an elevator counterweight, comprising: a first part configured to be connected, in use, to a suspension member of an elevator system, wherein the first part is arranged to receive an additional mass (e.g., a removable additional mass) when the first part is connected to the suspension member, such that a mass of the elevator counterweight can be varied.

It will be understood that a suspension member is one which suspends the mass of the elevator counterweight and also the elevator car, such that the mass of the elevator counterweight acts against the mass of the elevator car. It is sometimes referred to as a tension member, and it may be a cable, a belt, a rope, or the like. The first part of the elevator counterweight is configured to be connected, in use, to a suspension member of an elevator system. By "connected" it will be understood that the elevator counterweight could be either directly or indirectly connected to the suspension member. An indirect connection may be, e.g., via a pulley which is mounted to the first part and with the suspension member passing around the pulley.

In a first set of examples, the additional mass is a second part, wherein the second part is attachable to and detachable from the first part when the first part is connected to the suspension member. Thus, there is further disclosed an elevator counterweight, comprising: a first part configured to be connected, in use, to a suspension member of an elevator system; a second part, which is attachable to and detachable from the first part when the first part is connected to the suspension member, such that a mass of the elevator counterweight can be varied.

This advantageously provides an elevator counterweight, the mass of which can be varied in a simple manner, with the detachment or attachment of the second part.

In a second set of examples, the first part may comprise a container, and the additional mass may be a fluid or fluid-like material. The container may comprise an inlet, through which the fluid or fluid-like material can be added to the container. The container may comprise an outlet, through which the fluid or fluid-like material can be removed from the container. This advantageously provides an elevator counterweight, the mass of which can be varied by a continuous rather than discrete amount, i.e. the mass can be varied on a continuous scale.

The first part may further comprise a fixed mass. In some examples, the container is attachable to and detachable from the fixed mass when the fixed mass is connected to the suspension member. Thus the mass of the elevator counterweight might be varied by adding or removing some of the fluid or fluid-like material from the container, or by removing the container itself from the fixed mass (i.e., the container itself also provides "additional mass" which might be removed or re-added to alter the mass of the elevator counterweight). The features described below in relation to the attachment and detachment between the first part and the second part in the first set of examples may likewise apply to the connection between the container and the fixed mass in the second set of examples.

According to a second aspect of this disclosure there is provided an elevator system, comprising: an elevator car; an elevator counterweight as described above according to the first aspect; and a mass variation system, wherein the mass variation system is arranged to add additional mass to the first part and/or remove additional mass from the first part, so that a mass of the elevator counterweight can be varied.

In some examples of the first set of examples, the mass variation system may be a detachment system, wherein the detachment system is arranged to detach and/or reattach the second part from the first part, so that a mass of the elevator counterweight can be varied.

In some examples of the second set of examples, the mass variation system may comprise a supply system, e.g., a reservoir or a tap, arranged to supply the fluid or fluid-like material to the container, and/or an exhaust system, arranged to remove (some of) the fluid or fluid-like material from the container. The exhaust system may comprise the outlet of the container. Where the first part comprises the container and a fixed mass, the mass variation system may further comprise a detachment system, wherein the detachment system is arranged to detach and/or reattach the container from the fixed mass, so that a mass of the elevator counterweight can be varied.

According to a third aspect of the present disclosure there is provided a method of operating an elevator system, comprising: operating the elevator system to transport one or more loads; then, removing a mass (e.g., an additional mass) from an elevator counterweight; and operating the elevator system using the elevator counterweight having a reduced mass as a result of removal of the mass. In some examples, the method further comprises then adding a mass to the elevator counterweight. It will be understood that the mass which is added may be comprised of the same matter as the mass which was previously removed (e.g., the same part removed and then added back on), or may be new matter (e.g., newly supplied fluid or fluid-like material).

In a first set of examples, removing the mass from the elevator counterweight may comprise detaching a second part of the elevator counterweight (e.g., from a first part). The method may further comprise reattaching the second part of the elevator counterweight, i.e. adding a mass to the elevator counterweight comprises reattaching the second part.

In a second set of examples, removing the mass from the elevator counterweight may comprise removing a mass (e.g., some or all) of a fluid or fluid-like material contained within a container of the elevator counterweight, e.g., through an outlet. The method may further comprise adding a mass of fluid or fluid-like material to the container of the elevator counterweight. The fluid or fluid-like material may be new (e.g., from a continuous resource), or may be re-used (e.g., from a finite supply), i.e. it may be fluid which has already been used to provide mass to the elevator counterweight. For example, the fluid or fluid-like material may be removed from the container, into an exhaust system. The exhaust system may return the fluid or fluid-like material to a supply system (e.g. to a reservoir), which may then use this same fluid or fluid-like material to provide additional mass to the elevator counterweight when required in future. Where the first part comprises both a fixed mass and the container, removing the mass from the elevator counterweight may comprise removing the container from the fixed mass. Similarly, the method may further comprise attaching the container to the fixed mass.

The fluid or fluid-like material may be sand or water, or a mixture of sand and water. Other liquids may be used in place of water. Other powdered or granulated materials may be used in place of sand. The fluid-like material may be any flowable material.

By arranging an elevator counterweight to receive an additional mass, the mass of the elevator counterweight can be varied during its use in the elevator system. During use means during normal operation, i.e., not just selecting a suitable mass at a time of installation, but adaptively changing the mass in between runs during normal use. This is advantageous since the mass of the load within the elevator car varies throughout its use lifetime, and the disclosed arrangement allows the mass of the elevator counterweight to be varied to match this load mass (or an expected mass) more closely. Often during its use an elevator car travels empty (e.g., when traveling to pick up a passenger), or carries only a small number of passengers, such that the mass of a known fixed mass elevator counterweight is larger than required, and energy is therefore wasted transporting this additional mass of the elevator counterweight. The reduced energy consumption achieved by the disclosed arrangement is advantageous from an environmental perspective, and also since it reduces the cost of operating the system. Thus, in some examples, the method described above is a method of reducing energy consumption of an elevator system.

In some examples, the elevator system further comprises a controller, wherein the controller is arranged to control the mass variation system to add or remove the additional mass from the first part of the elevator counterweight. Thus, it will be understood that the mass variation system is controlled by the controller, i.e., electronically, optionally automatically and/or in a programmed manner, in contrast to manual operation by a maintenance person carrying out maintenance or modifications directly on the elevator counterweight.

As laid out above in some examples the mass variation system is, or comprises, a detachment system. Thus, in some examples the method comprises detaching the second part (or container) of the elevator counterweight under the control of a controller, and similarly optionally reattaching the second part (or container) of the elevator counterweight under the control of the controller. It will be appreciated that such attachment and detachment operations do not require taking the elevator out of service (and ideally may be carried out in the normal boarding/deboarding period between runs to avoid any delay).

Similarly, in some examples, the mass variation system comprises a supply system and an exhaust system, and the method comprises removing a mass of fluid or fluid like-material from the container by the exhaust system under the control of a controller and similarly optionally or alternatively adding a mass of fluid or fluid-like material to the container by the supply system under the control of the controller.

In some examples, the controller could be arranged to control the mass variation system according to a schedule. This schedule could be pre-set, e.g., based on a predicted pattern of usage, which could, for example, be developed by a machine learning algorithm. Preferably the schedule is adapted to the particular building in which the elevator system is installed. In order to achieve this, in some examples, the controller is arranged to carry out a learning process, comprising the controller receiving measurements, over a first time period, representative of a load within the elevator car. Then, after the first time period ends, the controller may determine a predicted schedule of the maximum load in the elevator car over time. Alternatively, the controller may send the measurements representative of a load within the elevator car over the first time period to a cloud service, wherein the cloud service is configured to determine the predicted schedule of the maximum load in the elevator car over time, and send this predetermined schedule to the controller. The controller may further be arranged to control the mass variation system to vary the mass of the elevator counterweight according to the predicted schedule. The predicted schedule may include periods of high maximum load and periods of low maximum load, wherein the mass of the elevator counterweight should be higher during periods of high maximum load and lower during periods of low maximum load. For example, the second part of the elevator counterweight should be attached during periods of high maximum load and detached for periods of low maximum load. Alternatively, a higher mass of fluid or fluid-like material should be present in the container during periods of high maximum load, and a lower mass during periods of low maximum load. The first time period, over which the learning process is carried out, may be at least a day, optionally at least a week, further optionally at least a month. A longer first time period is beneficial for obtaining more reliable data on the typical building usage.

Thus, the initial method step of operating the elevator system to transport one or more loads may comprise operating the elevator system with various loads for a first time period, and during the first time period collecting data representative of the various loads within the elevator car, then, determining a predicted schedule of the maximum load in the elevator car over time. The step of removing a mass from the elevator counterweight may comprise removing the mass according to the predicted schedule. The features described above with reference to the elevator system may also apply to the method, for example the method may be carried out by the components specified above, e.g., the controller and the mass variation system.

Patterns generally arise in the usage of an elevator system, e.g., across a day, a week, or a year, and the systems and methods described above allow this to be recognised and accounted for in how the mass of the elevator counterweight is varied. For example, an office building might have high use (and therefore a very full elevator car) during the morning and late afternoon, but at night might experience very low usage. Similarly, an office building will have low usage over the weekend. According to the present disclosure the mass of the elevator counterweight can be reduced (e.g., by detaching the second part or container or removing some fluid or fluid-like material from the container), in periods in which the expected load in the elevator car is consistently low and therefore a larger elevator counterweight is not required, thus saving energy. The controller may determine the predicted schedule using machine learning. The predicted schedule may be a predicted schedule for a day, or a week, or a month, or a year. A longer predicted schedule will advantageously account for variations which only occur on a longer time scale, e.g., once a month, or seasonally.

It is furthermore advantageous that this predicted schedule is not fixed, but rather is adaptive and can be continually or periodically updated so that its accuracy is improved over time, and any subsequent changes in the usage of the elevator system, e.g., due to changes in the building usage, are accounted for by changes in the predicted schedule. In some examples, after the first time period ends, the controller continues to receive measurements representative of the load within the elevator car, and updates the predicted schedule based on these measurements received after the end of the first time period. Similarly, the method step of operating the elevator system using the elevator counterweight having a reduced mass as a result of removal of the mass, may comprise during this operation collecting measurements representative of the load within the elevator car. The method may further comprise updating the predicted schedule based on the collected measurements.

The controller may be arranged to update the predicted schedule if a received measurement of the load within the elevator car exceeds an expected mass more than a threshold number of times. The threshold number of times may be increased over time, e.g., early on when the controller has not collected much data a single error might result in a change in the predicted schedule, but once more data has been collected, over an extended period, it might take two or more exceptions to the predicted schedule in order for the controller to update the predicted schedule. The threshold number of times may be reduced following an update to the predicted schedule, e.g., where the predicted schedule has needed to be changed the controller may subsequently become more sensitive to the need for further changes by reducing the threshold.

In some examples, the controller is configured to enable a reset function, wherein when activated the reset function causes the predicted schedule to be deleted or reset to a default schedule, and causes the learning process to be carried out again. By deleted it will be understood that the predicted schedule may not be deleted entirely from storage within the elevator system, but rather it is deleted from its use by the controller so that it is no longer used as the predicted schedule to set the elevator counterweight mass. It may be stored, i.e., backed-up, elsewhere in the controller or the elevator system so that it can be restored if required. This function allows the predicted schedule to be entirely reset, e.g., by a maintenance person, where it is considered that continued adjustment of the existing predetermined schedule over time (as described above) will not be sufficient (or sufficiently fast) to provide an adequate schedule. This may be advantageous where there has been a significant or dramatic shift in building usage, for example when a shift to home-working results in a rapid drop in elevator usage, or a change in usage of a building (or part of a building) e.g., from office to residential changes entirely the usage pattern of the elevator system.

In addition, or alternatively to varying the mass of the elevator counterweight at a scheduled time, the controller may be arranged to control the mass variation system to vary the mass of the elevator counterweight in response to a trigger from the elevator system. Thus, the method may further comprise adding a mass to the elevator counterweight in response to a trigger from the elevator system.

Where this is done in addition to varying the mass of the elevator counterweight at a scheduled time, it will be understood that the trigger from the elevator system may be arranged to override the predicted schedule, such that the mass of the elevator counterweight is varied (e.g., the second part is then detached/reattached, or fluid or fluid-like material is added to or removed from the container) at a time which is not in accordance with the schedule.

The trigger may be a user input, e.g., pressing or holding a button, or the elevator system may comprise a passenger detection portion which may send a trigger signal to the controller, e.g., when a number of passengers detected approaching the elevator car, or calling the elevator car, or located adjacent an entry point into the elevator system or elevator car, exceeds a threshold. For example, a camera might detect the number of passengers approaching a set of elevator doors and might determine that the reduced maximum load capacity ($M_{LoadMax}$) of the elevator car, due to the reduced mass of the elevator counterweight, is insufficient for it to accommodate all of those approaching passengers. In response to this the camera might signal the controller (either directly or via another controller or other circuitry) so that the controller controls the mass variation system to increase the mass of the elevator counterweight, thus increasing the load capacity, optionally restoring the elevator car to its maximum load capacity.

In addition, or alternatively, the trigger may be a signal from the elevator system indicating an emergency condition within the elevator system, or building. Thus, in the event of an emergency the increase in mass of the elevator counterweight (e.g., by reattachment of the second part or container, or addition of fluid or fluid-like material) may be triggered to take place immediately (rather than in accordance with the predicted schedule) either because of a signal from the elevator system or an input from a user. In addition, or alternatively, the trigger may be an indication of a planned override of the predicted schedule, e.g., due to a special event taking place in the elevator system. Thus, where it is known that an elevator system will be busy due to an event, e.g. a conference, taking place on a planned date, the predicted schedule can be overridden by the elevator system for that entire day so that the mass of the elevator counterweight is maintained at a higher (optionally maximum) value, e.g., the second part stays attached to the rest of the elevator counterweight for the whole day (or the container is filled with fluid or fluid-like material for the whole day).

In some examples the elevator system further comprises an elevator system controller arranged to control operation of the elevator system, wherein the control of the operation of the elevator system is adapted in correspondence with variations in the mass of the elevator counterweight. It will be appreciated that certain aspects of the control of the elevator system are dependent on the mass of the elevator counterweight. For example, planning a run profile and controlling the motor to deliver a certain acceleration will depend on the mass of the elevator counterweight as well as the mass of the elevator car (including its present load). Thus, the control of the elevator system may be varied according to the mass of the elevator counterweight (e.g., whether the second part or container is attached or detached, or how much fluid or fluid-like material is present in the container). As another example, the threshold load which is used by the elevator system controller to determine an overload condition of the elevator car may be varied based on variations in the mass of the elevator counterweight. Thus, in some examples the method further comprises an elevator system controller adjusting control of the elevator system in response to variation in the mass of the elevator counterweight.

It will be understood that the elevator system controller may also provide the controller described above, i.e., they may both be separate parts of the same controller, or alternatively they may be separate controllers.

In some examples the elevator car further comprises a dynamic display, and the dynamic display is arranged to display a current duty load, wherein the current duty load varies in correspondence with variation in the mass of the elevator counterweight. Thus, the duty load value, i.e., the safe maximum load, is displayed in the elevator car in a dynamic (i.e., changeable) way, using a dynamic display, so that the displayed duty load can be kept up to date to match the current mass of the elevator counterweight. The safe maximum load of the elevator car may be required by safety regulations to be displayed in the elevator car. For the disclosed elevator system, the safe maximum load may be reduced when the mass of the elevator counterweight is reduced, meaning that this reduced safe maximum load should be displayed. The dynamic display therefore helps the elevator system to comply with safety regulations, and helps to provide passengers with up to date information. In some examples, the dynamic display is an existing display within the elevator car, e.g., a display that is used for display of floor information or advertisements. This is further advantageous since no additional display needs to be provided for the specific purpose of displaying the varying duty load value. Similarly, in some examples the method further comprises changing the display output of a dynamic display in response to variation in the mass of the elevator counterweight.

In some examples the elevator system further comprises at least one operation-mode display, wherein the operation-mode display is arranged to display an indication of an elevator mode of operation, wherein the mode of operation corresponds to a variation in the mass of the elevator counterweight. This operation-mode display could be located within the elevator car, or outside a set of hoistway doors, e.g., on an elevator landing, or it could be on a user device which operates in connection with the elevator system and is carried by a passenger. The same display might provide both the operation-mode display and the dynamic display described above. Similarly, in some examples the method further comprises changing the display output of the operation-mode display in response to variation in the mass of the elevator counterweight.

Alternatively, or in addition, in some examples the elevator system further comprises an audible notification system, wherein the audible notification system is arranged to output an audible message (e.g., a spoken message) indicating an elevator mode of operation, wherein the mode of operation corresponds to a variation in the mass of the elevator counterweight. This audible notification system could be located within the elevator car, or outside a set of hoistway doors, e.g., on an elevator landing, or it could be on a user device which operates in connection with the elevator system and is carried by a passenger. Similarly, in some examples the method further comprises changing the audible message output by the audible notification system in response to variation in the mass of the elevator counterweight. The audible message could simply state the mode of operation, or could provide further explanation to passengers, e.g., it could explain why the number of passengers is limited to a lower number than the space in the elevator car suggests.

The displayed mode of operation, or audible message, could correspond to a normal mode of operation, and/or a reduced-counterweight-mass mode, e.g., an "eco" mode in which the mass of the elevator counterweight has been reduced to make it less than its maximum (e.g., by detaching the second part or removing some fluid or fluid-like material from the container) to reduce energy consumption of the elevator system. The operation-mode display could display the mode of operation of an individual elevator car or the whole elevator system. There could be at least one operation-mode display associated with each elevator car to separately display the mode of operation of each elevator car. The operation-mode display could always display the mode of operation (e.g., whether it is a normal mode or an "eco" mode), or could selectively display only certain modes of operation, for example the operation-mode display could only be active when the mode of operation is a reduced-counterweight-mass mode, e.g., an "eco" mode. Similarly, the audible notification system might only output an audible message when the mode of operation is a reduced-counterweight-mass mode.

This notification can help to keep passengers informed regarding the status of the elevator system, and also prompt passengers to be more understanding and forgiving of delays. One possibly frustrating scenario which a passenger might experience is if the elevator car arrives at their floor but will not allow them to enter as the current duty load would be exceeded (because the mass of the elevator counterweight has been reduced) even though there is visibly space in the elevator car. This frustration is alleviated for some passengers by understanding that the elevator is operating in this mode to reduce energy consumption.

In some examples, the elevator system further comprises a hoistway within which the elevator car is configured to travel. The hoistway may comprise at least one hoistway wall, e.g., four hoistway walls. In some examples the mass variation system may be located within the hoistway. Optionally, the mass variation system may be (partially or entirely) located at (e.g., attached to) one or more walls of the hoistway. In some examples, the hoistway comprises a supply system (e.g., a tap) arranged to supply output fluid or fluid-like material into the container. The hoistway may comprise a single supply system, or may comprise more than one supply system, e.g., two supply systems located at different floors of the elevator system, or a supply system located on each floor of the elevator system.

In some examples, the hoistway comprises a parking location. The elevator system may be configured so that the additional mass (e.g., the second part or container) of the elevator counterweight is stored in the parking location when it has been detached from the elevator counterweight by the mass variation system. In other examples, the elevator system is configured so that fluid or fluid-like material can be deposited at the parking location, e.g., into a reservoir from which it can later be collected again. In some examples, the elevator system may comprise a reservoir which may provide both the supply system and the exhaust system, such that the fluid or fluid-like material is passed back and forth between the reservoir and the elevator counterweight to vary the mass of the elevator counterweight. The reservoir may, for example, be located on a hoistway wall or on the elevator car. Alternatively, the elevator system, e.g., the pit of the hoistway, may comprise a drain, to remove the fluid or fluid-like material, which has been removed from the elevator counterweight, from the hoistway. In some examples a drain may be provided at several floors or at every floor. The mass variation system need not be based on reservoirs, but may provide fluid or fluid-like material from a continuous supply such as a building water supply (e.g., supplied via a local or national water supply system). Likewise, drainage may be via a building waste or sewerage system which may be available at several floors or at every floor.

In some examples, the parking location may be located within the pit of the hoistway. It will be understood that “the pit” is a recognised and standard term to refer to the lower end of the hoistway. In some other examples, the parking location might be located at/on the hoistway wall.

The parking location might be provided by one or more protrusions from the hoistway walls, e.g., a hook or shelf protruding from the hoistway wall. The protrusion(s) might be retractable into or adjacent to the hoistway wall, e.g., when they are not being used to store the second part of the elevator counterweight. In some examples, the protrusion (or one or more of the protrusions where there are multiple) provides an engagement mechanism, wherein the elevator system is configured so that the second part of the elevator counterweight (or the container) is attached to the protrusion when it has been detached from the elevator counterweight by the detachment system.

In some examples, the parking location is at a height in the hoistway which corresponds to a height of the elevator counterweight when the elevator car is positioned at a main floor of the elevator system, wherein the main floor of the elevator system is the floor of the elevator system at which the majority of incoming passengers arrive at the elevator system. Thus, when the elevator car is positioned at the main floor, the elevator counterweight is at the same height as, and therefore adjacent to, the parking location. This means that when the second part of the elevator counterweight (or the container), which is stored in the parking location, is required it may be quickly reattached whilst the elevator car stays positioned at the main floor. Similarly, where a supply of fluid or fluid-like material is stored at the parking location this can be added to the container. This is advantageous since the main floor is where the majority of incoming passengers (i.e., passengers wishing to board an elevator car) arrive at the elevator system, and therefore the floor at which the number of passengers attempting to board the elevator car is most likely to exceed the duty load. Where the duty load is exceeded because the elevator car has a reduced duty load (i.e., the second part has been detached from the elevator counterweight), the duty load of the elevator car can be quickly and conveniently increased by increasing the mass of the elevator counterweight, thereby avoiding inconvenience to the incoming passengers, e.g., by the detachment system reattaching the second part to the elevator counterweight.

The main floor of the elevator system may be the ground floor, wherein the ground floor of the elevator system is the floor which corresponds to the entry floor of a building in which the elevator system is installed. It will be understood that in many instances the ground floor will be the lowest floor of the elevator system, i.e., the lowest passenger floor to which the elevator car travels, but in systems with one or more basement or “underground” levels, although still referred to as the “ground” floor, the floor corresponding to the building entrance might actually be the second, third, or higher, floor above the lowest passenger floor to which the elevator car travels. In systems where some elevator cars only serve certain floors, e.g., with a “sky lobby”, such a sky lobby may be a “main floor” of the elevator system, since many passengers are transported to there and then arrive at the sky lobby needing to access a further elevator car.

In some examples, in which the elevator counterweight comprises a second part, the elevator counterweight also further comprises a third part, which is attachable to and detachable from the first part when the first part is connected to the suspension member. In some examples the elevator counterweight further comprises a fourth part, which is attachable to and detachable from the first part when the first part is connected to the suspension member. The inclusion of multiple parts (e.g., totaling two, three or more) provides increased versatility to the system. Thus, the method may further comprise detaching and/or reattaching these third (and optionally fourth) parts.

In some examples, the second part (and optionally the third and any other additional parts) is configured to attach to the first part such that the mass of the second part is distributed symmetrically with respect to the first part. In particular, the mass of the second part may be distributed symmetrically on either side of a vertical midline of the first part. Similarly, in other examples where the additional mass is provided by a fluid or fluid-like material, the container may be arranged to contain the fluid or fluid-like material such that it remains symmetrically distributed on either side of a vertical midline of the container, regardless of the mass of fluid or fluid-like material contained in the container. The container may furthermore be arranged to attach to the fixed mass such that the mass of the container is distributed symmetrically with respect to the fixed mass. Elevator counterweights often run in guiderails within the hoistway and therefore keeping the mass of the elevator counterweight symmetrical with respect to the guiderails helps to reduce noise and friction. Thus, the mass of the second part, container, or the fluid or fluid-like material within the container, may be distributed symmetrically with respect to a vertical midline between the two guiderails. More specifically, the mass may be distributed symmetrically with respect to a vertical plane perpendicular to a plane containing both guiderails, the vertical plane passing through the centre of mass of the first part. Additionally, or alternatively, the mass may be distributed symmetrically with respect to a vertical plane containing both guiderails and passing through the centre of mass of the first part. With such symmetries the attachment of the second part (and/or other parts) or the container to the first part or of the fluid or fluid-like material can substantially reduce, or even avoid changes in the overall centre of mass of the elevator counterweight. Thus, the centre of mass of the elevator counterweight may be the same whether the elevator counterweight comprises just the first part or whether the elevator counterweight comprises both the first part and the second part (and optionally also a third and/or further part), or includes the container, and contains some fluid or fluid-like material. This reduces or avoids changes in friction and noise and braking ability of the elevator counterweight with variations in the mass of the elevator counterweight, e.g., due to attachment/detachment of counterweight parts.

The second and third parts may be configured to be both attached to the elevator counterweight simultaneously, i.e., both are able to be attached to the elevator counterweight at the same time, as well as each separately. It will be understood that these examples can provide elevator counterweights with more than two different masses depending on which parts are detached/attached, i.e., an elevator counterweight having a third part will have four possible masses—a maximum mass (in which the elevator counterweight includes all three parts), a first reduced mass (in which the elevator counterweight includes the first and second parts but the third part is detached), a second reduced mass (in which the elevator counterweight includes the first and third parts but the second part is detached), and a fully reduced mass in which the elevator counterweight comprises only the first part, and the second and third parts are detached. It will be understood that there might be multiple types or levels of “eco” mode, discussed above, each corresponding to the different masses (lower than the maximum mass) that the elevator counterweight might have depending on which of the multiple detachable parts are attached to the elevator counterweight. Similarly, for examples in which the additional mass is provided by fluid or fluid-like materials, there may be multiple types of levels of “eco” modes, corresponding to different threshold amounts, or ranges, of mass of fluid or fluid-like material contained in the container.

In some examples, in order to simplify the attachment/detachment mechanism, the third part may only be attachable in addition to the second part, i.e., so that only three possible masses are available (first part only or first plus second parts or first plus second plus third parts). The same principle may of course be extended to a fourth part or further parts.

Alternatively, the second and third parts might each be substantially the same, but might be located at different heights within the hoistway, when detached from the elevator counterweight. Thus, the parts are not both attached to the first part at the same time, but are spaced apart in the hoistway. This would mean that the elevator counterweight is generally located closer to a part when one is required, since multiple parts are positioned in the hoistway. This can reduce the average time needed to attach an additional part to the elevator counterweight when one is required as the elevator car does not need to move as far to pick it up.

More generally the second part and the third part (whether attachable only separately to the elevator counterweight or also simultaneously) might be positioned at different heights within the hoistway, e.g., the hoistway might comprise more than one parking location, located at different heights. Thus, in some examples the hoistway further comprises a second parking location. Each parking location might be specific to each of the second and third parts respectively. Alternatively, the elevator system may be configured so that each of the second part and the third part of the elevator counterweight is storable at each of the first and second parking locations when they have been detached from the elevator counterweight by the detachment system.

In some examples the second part (and optionally the third part) comprises at least one engagement mechanism, e.g., a hook. This engagement mechanism may be arranged to engage with the first part of the elevator counterweight, i.e., to attach the second part to the elevator counterweight. Alternatively, the first part may comprise at least one engagement mechanism, e.g., a hook. This may help to enable attachment of the second part (and optionally the third part) to the first part.

In addition, or alternatively, the parking location (e.g., the one or more protrusions) may comprise at least one engagement mechanism. The engagement mechanism might be provided by the protrusions described above. For example, the parking location might comprise a hook, or alternatively be configured to engage with a hook provided on the second part. This mechanism may allow the second part (or the third part) to be attached at the parking location, e.g., to keep it securely stored out of the way in the hoistway whilst it is not being used.

In some examples the engagement mechanism provides the detachment system. For example, a hook on the first part of the elevator counterweight might be controlled by the controller to selectively engage with, and release, a corresponding engagement region, e.g., a loop or an orifice, of the second part of the elevator counterweight, to pick up or drop off the second part of the elevator counterweight when desired. Thus, the first part or second part may comprise a first engagement mechanism, e.g., a hook, and the parking location may comprise a second engagement mechanism. The first and second engagement mechanism might work in cooperation, or synchronisation with each other to provide the detachment system, e.g., so that the first engagement mechanism releases the connection between the first part and the second part at the same time as (or in sequence with) the second engagement mechanism engages with the second part, to remove it from the first part (and vice versa for reattachment). Alternatively, it will be understood that a separate detachment system might be provided to unfasten, remove, or otherwise disengage an engagement mechanism to cause detachment, and similarly fasten or engage the engagement mechanism to cause reattachment.

In some examples the detachment system may be located at the parking location. For example, the detachment system may comprise the engagement mechanism, which may be provided at the parking location. For example, a hook on the hoistway wall might selectively hook onto the second part, removing it from the first part and then holding it in the parking location whilst the rest of the elevator counterweight continues to move.

Advantageously, the detachment mechanism is arranged to carry out the attachment or detachment of the second part in less than the standard time for which the elevator car waits at a floor, during normal operation. Thus, the detaching or reattaching of the second part of the elevator counterweight does not take longer than the sum of the normal stop time of the car, and the time for the passengers to leave the car, so that operation of the elevator system is not delayed.

According to a further aspect of this disclosure there is provided an elevator system comprising: a first elevator car; a first elevator counterweight, as described above, attached to the first elevator car; a mass variation system; a second elevator car; and a second elevator counterweight, attached to the second elevator car.

The elevator system may have any of the features of the elevator system described above, i.e., operating in connection with the first elevator counterweight.

In some examples, the second elevator counterweight might also be an elevator counterweight as described above, so that there is provided an elevator system containing multiple elevator cars, where each has a corresponding elevator counterweight and where each elevator counterweight has a variable mass. The masses of the counterweights may be variable by the same method (e.g., both may include a respective part which is detachable and reattachable), or they may be variable by different methods, (e.g., one having a removable part and the other being a container arranged to receive a fluid or fluid-like material).

Alternatively, the second elevator counterweight might be a single-mass elevator counterweight, i.e., an elevator counterweight which is not arranged to have a mass which is variable during normal operation of the elevator system. This may be advantageous since the second elevator car will always operate at its full capacity, since its corresponding elevator counterweight does not have a variable mass. During low traffic periods, the first elevator car with adjustable elevator counterweight can be used preferentially.

It will be understood that the various features laid out above with reference to the elevator system may also apply to the method described above, even where they are not explicitly laid out in the context of the method claim.

DETAILED DESCRIPTION

Certain preferred examples of this disclosure will now be described, by way of example only, with reference to the accompanying drawings, in which.

Figure 9:
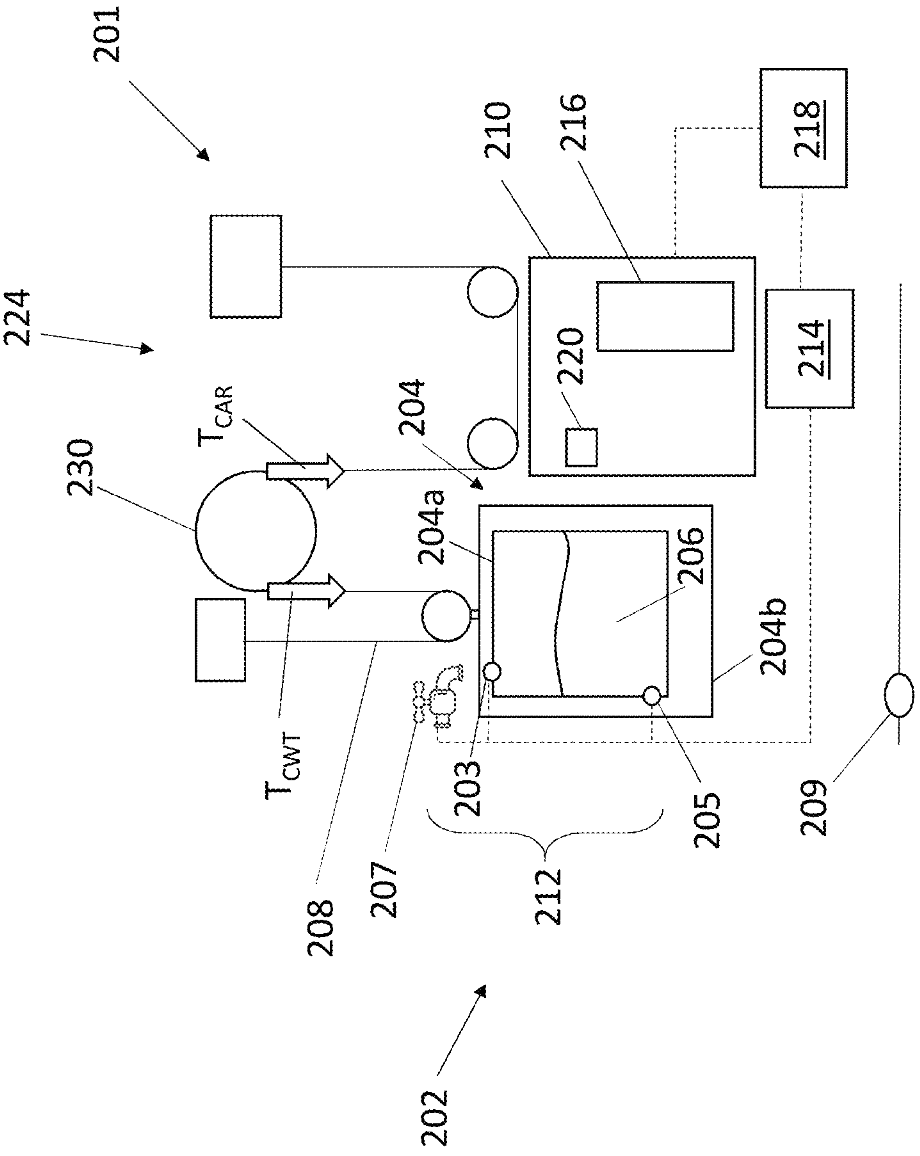
Figure 10:
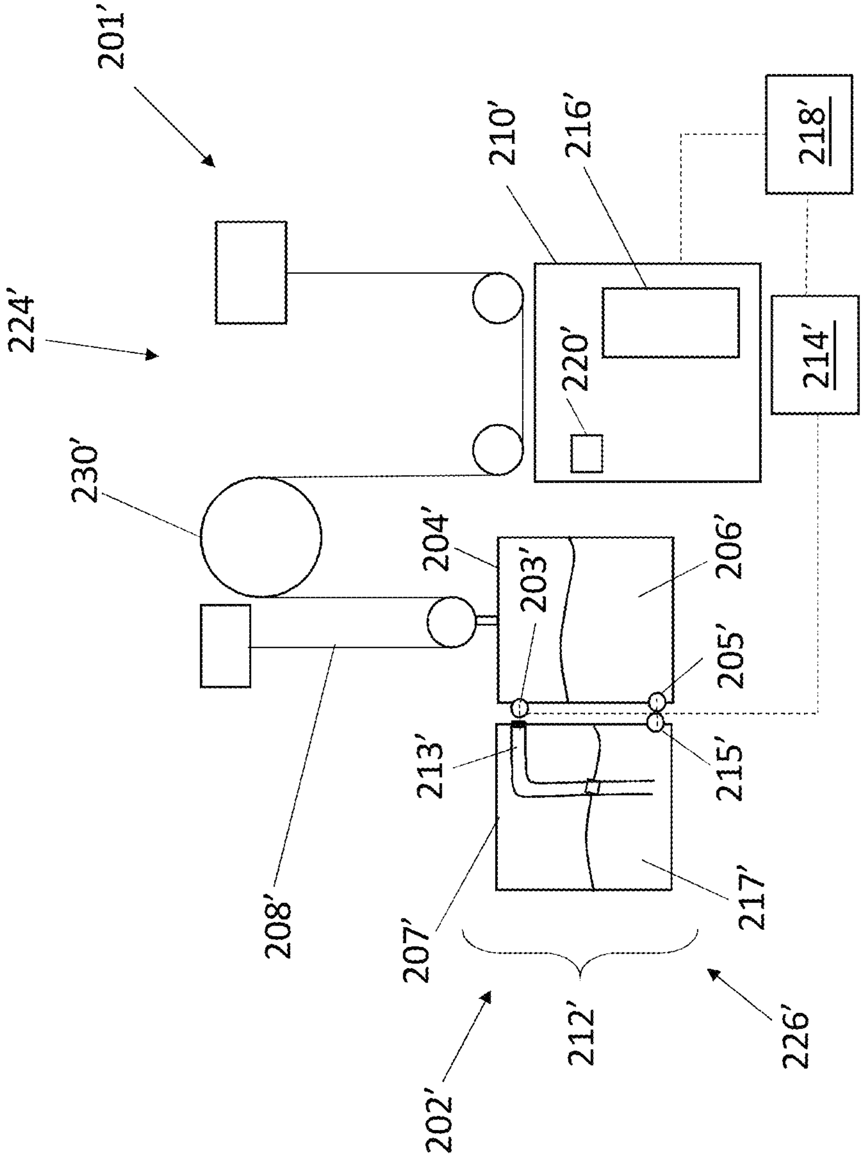

FIG. 9 is a schematic drawing showing an elevator system according to a third example of the present disclosure including an elevator counterweight according to a fifth example of the present disclosure; and FIG. 10 is a schematic drawing showing an elevator system according to a fourth example of the present disclosure including an elevator counterweight according to the fifth example of the present disclosure.

DETAILED DESCRIPTION

Figure 1:
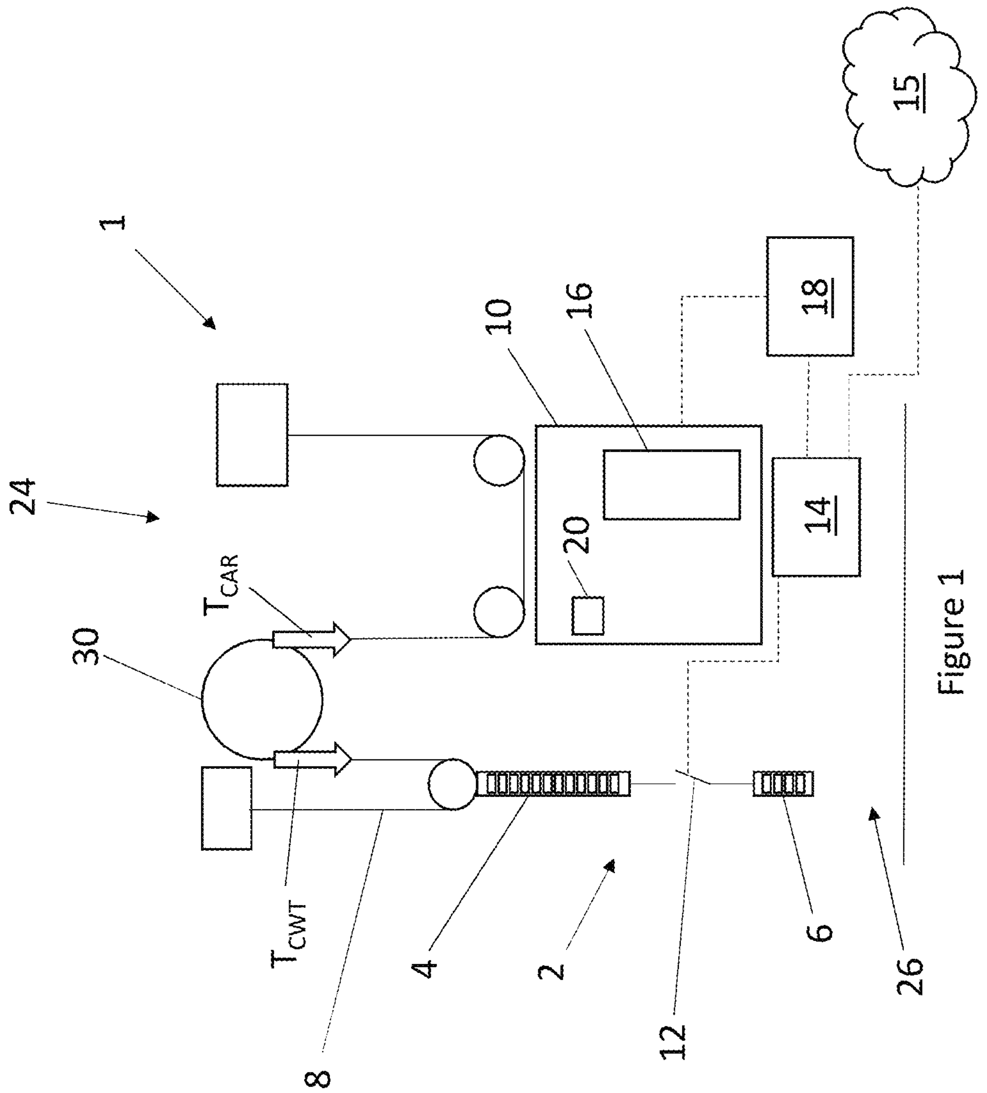
FIG. 1 is a schematic drawing showing an elevator system according to a first example of the present disclosure.

FIG. 1 shows an elevator system 1 according to a first example of the present disclosure. The elevator system 1 includes a motor 30, which drives movement of a suspension member 8. The suspension member 8 suspends an elevator counterweight 2, on one side of the motor 30, applying a torque $T_{CWT}$ in a first direction of rotation, and suspends an elevator car 10 on the other side of the motor 30, applying the torque $T_{CAR}$ in a second direction of rotation. These components are located in a hoistway 24, the walls of which are not shown in FIG. 1. The arrangement of sheaves, and end-hitches which is used to suspend the elevator car 10 and the elevator counterweight 2 is not important to the present disclosure, and the various possible arrangements are well known in the art and will therefore not be described in detail here. For example, a 2:1 roping arrangement is shown in FIG. 1, but a 1:1 or other roping arrangement is equally viable.

The torque $T_{CAR}$ applied to the motor 30 in the clockwise direction is proportional to the mass of the elevator car 10, added to the mass of a load 16 which is transported within the elevator car 10. The torque $T_{CWT}$ applied to the motor 30 is proportional to the mass of the elevator counterweight 2. For the most efficient operation of the elevator system 1, requiring the lowest torque output from the motor 30, it is desirable that the mass of the elevator counterweight 2 matches as closely as possible the sum of the mass of the elevator car 10 and the mass of the load 16 within the elevator car 10.

In order that the mass of the elevator counterweight 2 might continue to match this value more closely throughout operation of the elevator system 1, the elevator counterweight 2 is arranged so that its mass is variable. In particular, the elevator counterweight 2 includes a first part 4 and a second part 6. The first part 4 is connected to the suspension member 8 (in FIG. 1 it is shown connected via a pulley, but in other examples it could be connected by an end hitch). The second part 6 is attachable to and detachable from the first part 4 when the first part 4 is connected to the suspension member 8, so that the mass of the elevator counterweight 2 is variable. In this example the elevator counterweight 2 includes just one detachable part, i.e., the second part 6. The elevator counterweight 2 can therefore either have a low-mass configuration, or a full mass configuration (i.e., 100%), depending on whether or not the second part 6 is attached to the elevator counterweight 2. In this particular example the attachment and detachment (i.e., the mass variation system) is achieved by a detachment system 12, which in this example is a hook, represented schematically in FIG. 1.

When the detachment system 12 detaches the second part 6, i.e., unhooks it so that the second part 6 is no longer connected to the first part 4, the second part 6 is stored at a parking location 26, which is at the bottom of the hoistway 24 (i.e., the pit), where clearly this is not represented to scale in FIG. 1. The storage of the second part 6 at the parking location 26 allows the second part 6 to be conveniently reattached when it is required again.

The operation of the elevator system 1 is controlled by an elevator system controller 18, as represented by a dashed line connecting the elevator system controller 18 to the elevator car 10. This elevator system controller 18 is connected to a controller 14 (as shown with a dashed line) which in turn controls the detachment system 12 (as explained below with reference to FIG. 2) as represented by a dashed line from the controller 14 to the detachment system 12. The controller 14 is optionally connected to a cloud service 15, which is remote from the elevator system 1.

The elevator system controller 18 varies certain system parameters based on whether or not the second part 6 is connected to the first part 4 of the elevator counterweight 2, i.e., whether the second part 6 is contributing to the mass of the elevator counterweight 2. For example, the threshold load which is used by the elevator system controller 18 to determine an overload condition of the elevator car 10 is varied based on variations in the mass of the elevator counterweight 2. The elevator car 10 further includes a dynamic display 20 which displays the current threshold load, i.e., the current duty load.

Figure 2:
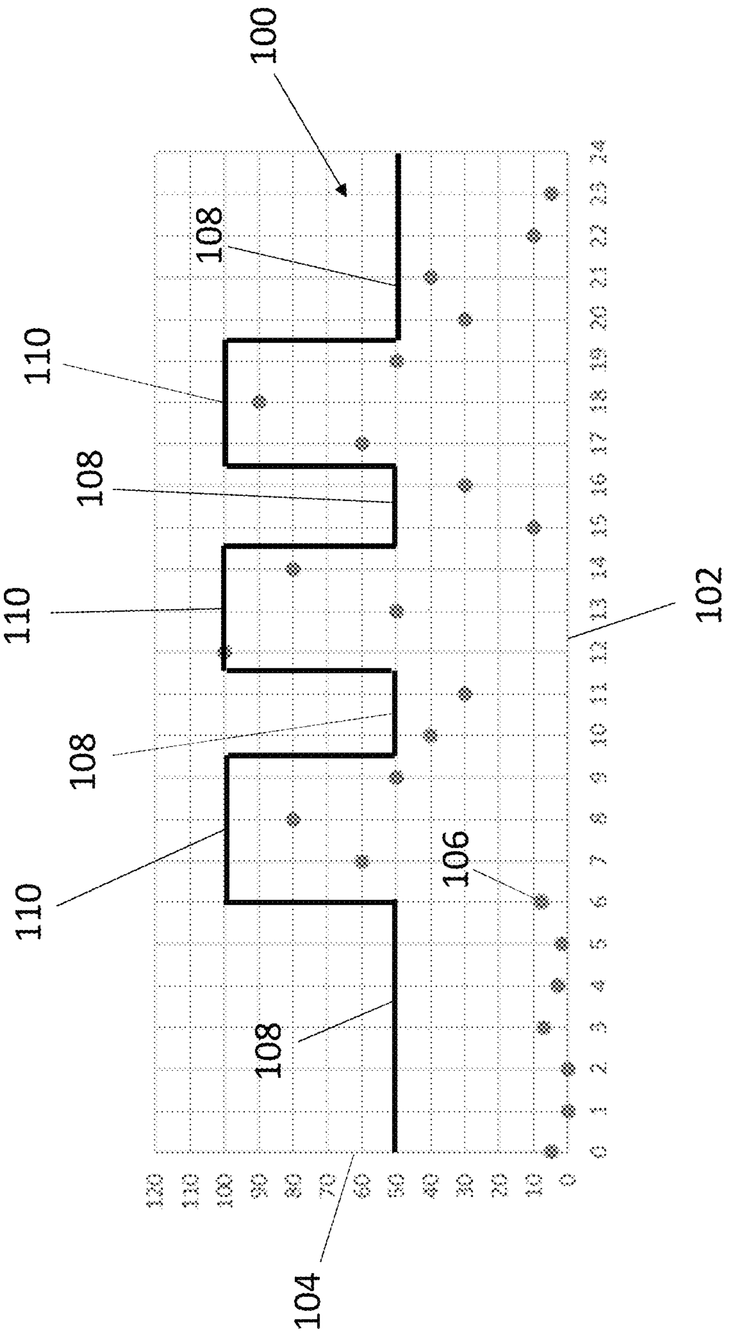
FIG. 2 is a graph showing a predicted schedule as can be used in accordance with an example of the present disclosure.

FIG. 2 is a graph showing a predicted schedule 100 which has been derived by the controller 14. This example schedule 100 shows one of the ways in which the elevator system can operate to control the detachment system 12. The horizontal axis 102 of the graph represents time, in units of a one-hour period, whilst the vertical axis 104 represents the mass of the load 16 as a percentage of the maximum duty load of the elevator car 10. The maximum duty load is achieved when the second part 6 of the elevator counterweight 2 is attached to the first part 4 of the elevator counterweight 2 such that the elevator counterweight has its largest possible mass. A lower duty load (in this example 50%) is achieved when the second part 6 is detached from the first part 4 so that the elevator counterweight 2 has a lower mass. Each dot 106 represents a data point, which is the maximum measured mass value (as a percentage of duty load) of the load 16, transported by the elevator car 10 within that particular hour time slot. In order to obtain the data points 106, the controller 14 carries out a learning process, during which the controller 14 receives measurements of load, over a first time period. The controller 14 can then send these measurements of load, over a first time period to the remote cloud service 15. The cloud service 15 then determines the predicted schedule of the maximum load in the elevator car over time, and sends this predetermined schedule to the controller 14. Alternatively, the predetermined schedule may be calculated on the controller 14 itself without using the cloud service 15. The first time period may be a single 24-hour period, i.e., 1 day, or it may extend over several days with the data for each hour slot being accumulated over multiple days. It will also be appreciated that the measurements may be associated with a day of the week, or a day of the month or year so that weekly, monthly or seasonal variations in use can be captured. It will also be appreciated that data may be captured at higher or lower resolution than hourly intervals. For example, it may be captured at a minute level or at a 3-hourly level, or at a day level. Purely by way of example, in the latter case, with data points at day level, the system can establish e.g., whether the elevator counterweight can be detached for particular days, such as weekend days or holidays.

Based on these data points 106, the cloud service 15 (or the controller 14) carries out machine learning (or any other suitable computational process or algorithm) and determines a predicted schedule 100 of the times 108 at which the mass of the load 16 in the elevator car 10 is not expected to exceed 50% of the duty load, and the times 110 at which it is expected to exceed 50% of the duty load. Again, it will be appreciated that 50% is purely one example of the lower duty load. This figure will depend on the ratio of the masses of the first part and the second part and can be selected appropriately for the system, or indeed it can be selected or adjusted based on the data acquired during the learning period.

The controller 14 then controls the detachment system 12 according to this schedule 100, so that at the beginning of each low-mass time period 108, the second part 6 of the elevator counterweight 2 is detached, and then at the end of each of these low-mass time periods 108, i.e., at the beginning of each high-mass time period 110, the second part 6 is reattached to the elevator counterweight 2, i.e., to the first part 4. Since the total mass of the elevator counterweight 2 (the first part+the second part) is optimised for when the load 16 is half of the maximum duty load, it is excessive in those periods 108 in which the load is expected to stay well below that maximum load value. By reducing the total mass of the elevator counterweight 2 in those time periods by detaching the second part 6, the efficiency of the elevator system is improved by temporarily reducing the duty load to less than the maximum duty load.

The controller 14 continues to receive the load values after the initial learning process, and either the controller 14 or the cloud service 15 adjusts the predicted schedule 100 based on this further data. For example, if the load value in a low-mass time period 108 exceeds half the duty load more than a threshold number of times, the schedule 100 can be updated to make this time period, or part of it, a high-mass time period 110. The threshold number of times might be increased over time, e.g., early on when the controller 14 has not collected much data a single error might result in a change in the schedule 100, but once a large quantity of data has been collected over an extended period, it might be better to require several exceptions to occur before the controller 14 or the cloud service 15 updates the predicted schedule 100.

The controller 14 may have a reset function, which, when activated, causes the predicted schedule 100 to be forgotten, e.g., deleted or overridden, and then causes the learning process to be carried out again, to derive an entirely new predicted schedule 100 from a new set of collected data.

Figure 3:
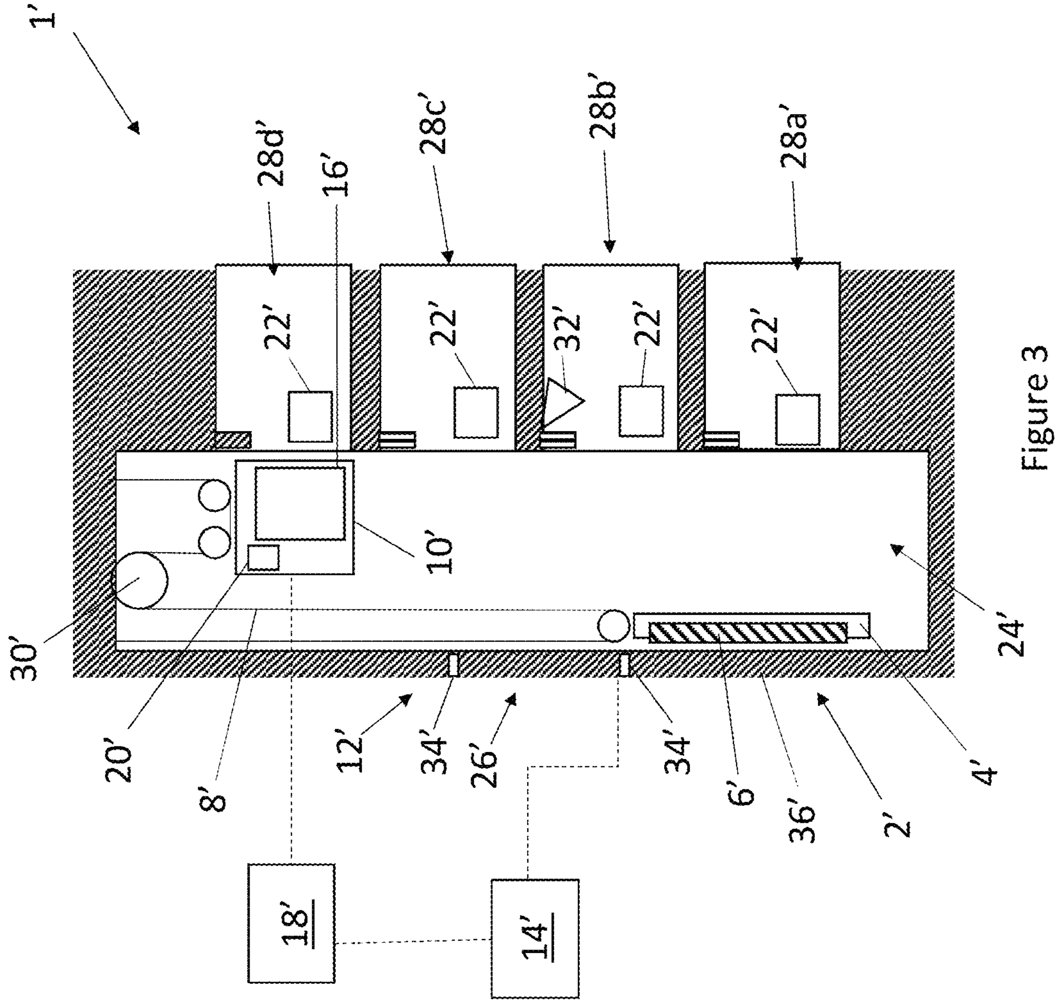
FIG. 3 is a schematic drawing showing an elevator system according to a second example of the present disclosure.
Figure 4:
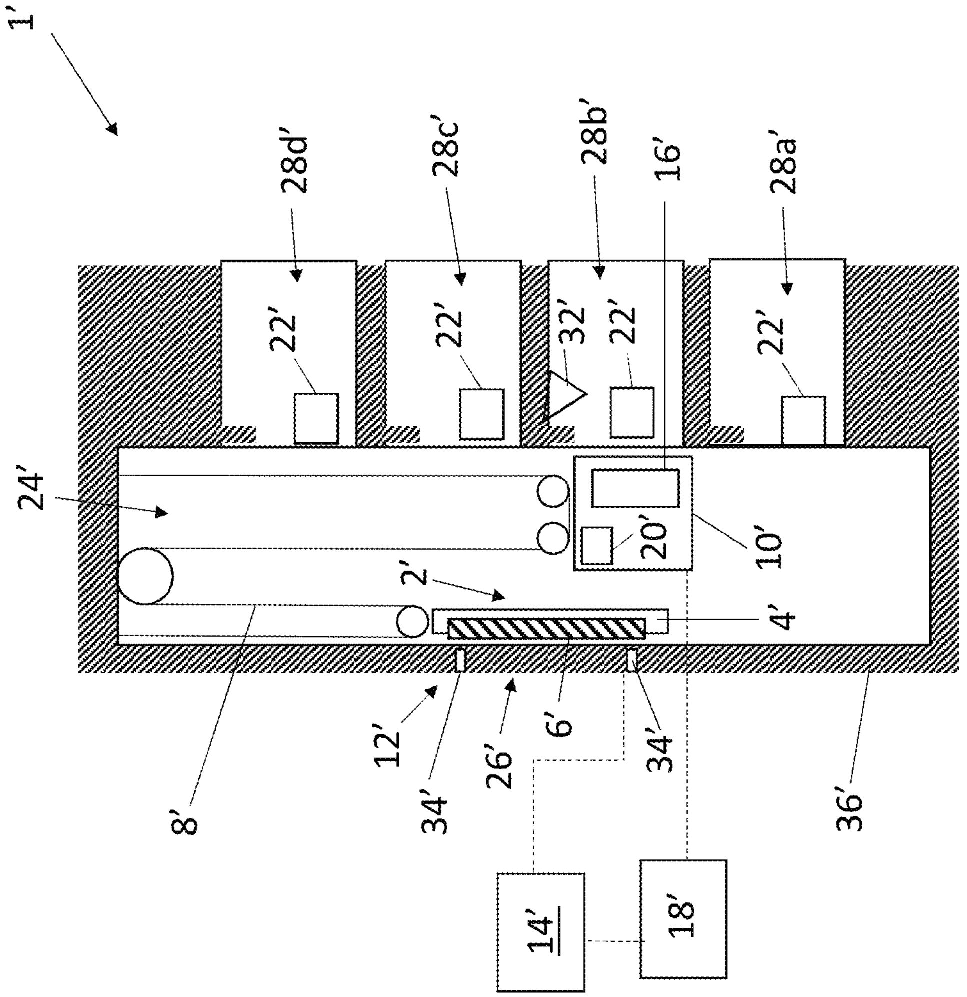
FIG. 4 is a schematic drawing showing the elevator system of FIG. 3 in which the elevator car is attached to the elevator counterweight, and positioned adjacent the parking location.
Figure 5:
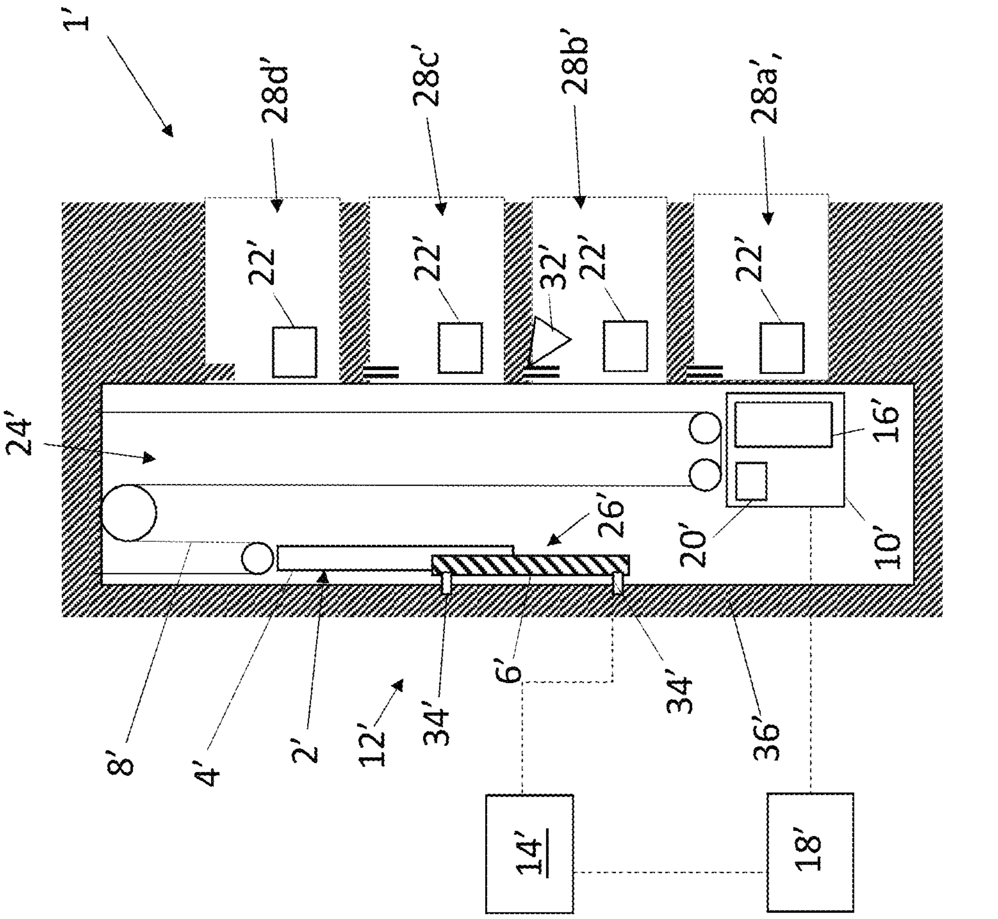
FIG. 5 is a schematic drawing showing an elevator system of FIG. 3 in which the second part of the elevator counterweight is stored at the parking location.

FIGS. 3, 4 and 5 are schematic drawings showing an elevator system 1' according to a second example of the present disclosure. Like components of the elevator system have been labelled with the same labels as used above with reference to FIG. 1, but denoted with an additional apostrophe, e.g., 1' rather than 1.

As with the example of FIG. 1, the elevator system 1' includes a motor 30', which drives movement of a suspension member 8'. The suspension member 8' suspends an elevator counterweight 2' on one side of the motor 30' and an elevator car 10' on the other side of the motor 30'. These components are located in a hoistway 24'. The hoistway 24' connects to four different floors of a building (not shown) in which the elevator system 1' is located. The floors include a basement, or underground landing **28*a*', also referred to as a −1 landing, a ground floor landing 28*b*', a first floor landing 28*c*' and a second floor landing 28*d*'. The ground floor is referred to as the ground floor since it is the floor which corresponds to the entry floor of the building in which the elevator system 1' is installed. In this example the ground floor is also the main floor of the elevator system 1', since it is the floor of the elevator system at which the majority of incoming passengers arrive at the elevator system 1', and possibly also or alternatively the floor at which the majority of outgoing passengers leave from the elevator system 1'**.

The elevator counterweight 2' includes a first part 4' and a second part 6'. The first part 4' is connected to the suspension member 8'. The second part 6' is attachable to and detachable from the first part 4' when the first part 4' is connected to the suspension member 8', so that the mass of the elevator counterweight 2' is variable.

The operation of the elevator system 1' is controlled by an elevator system controller 18', in the same manner as the elevator system controller 18 described above, and the elevator car 10' similarly includes a dynamic display 20' which displays the current threshold load.

The elevator system controller 18' is connected to a controller 14', which controls detachment and reattachment of the second part 6'. The controller 14' is capable of carrying out the same functionality as the controller 14, as described above with reference to FIG. 2, and this therefore will not be described again. Furthermore, in this example, there is no cloud service, and instead the controller 14' itself is able to provide the functionality described above with reference to the cloud service, for example determining and updating the predicted schedule. Additionally, the controller 14' is also able to detach or reattach the second part 6' in a manner which is not in accordance with the predicted schedule 100, i.e., to override the predicted schedule 100, based on a trigger received from the elevator system 1'.

In this example the ground floor landing **28*b*' includes a camera 32' which is arranged to detect the number of passengers approaching the ground floor landing 28*b*'. Where it is deemed that the current duty load of the elevator car 10' is insufficient for the elevator car 10' to accommodate all of the passengers approaching the ground floor landing 28*b*' due to the second part 6' of the elevator counterweight 2' being in a detached state, the camera 32' signals the controller 14', which then controls the detachment system 12' to reattach the second part 6' to the elevator counterweight 2', even if this is not in accordance with the predicted schedule 100, thus restoring the elevator car 10' to its maximum load capacity. As described above, the ground floor 28*b*' of this particular exemplary building is the main floor, and therefore the floor where most passengers arrive, and it is therefore the landing at which the number of waiting passengers is most likely to exceed the current duty load. It is therefore advantageous that the camera 32'** is located at this particular floor. It will of course be appreciated that cameras may be positioned at any or all of the others floors and also that sensors other than cameras may be used, e.g., depth-sensing sensors, infrared detectors, etc.

The elevator system 1' further includes landing displays 22' at each of the landing floors **28*a*', 28*b*', 28*c*', 28*d*'. These landing displays 22' are arranged to display an indication of an elevator mode of operation, where the mode of operation corresponds to a current state (or mass) of the elevator counterweight 2'. Thus, in this example the landing displays 22' provide operation-mode displays. If the second part 6' is attached to the first part 4', thus forming part of the elevator counterweight 2', then the duty load of the elevator car 10' is at its maximum and the mode of operation is "normal". This might be displayed on the landing displays 22', but also might not be indicated as there is no need to notify passengers of normal operation. If the second part 6' is detached from the elevator counterweight 2', then the duty load of the elevator car 10' is below its maximum duty load and the mode of operation is a "reduced" or "environmentally friendly" or "eco" mode. This is displayed on the landing displays 22' and possibly also on the dynamic display 20' within the elevator car 10', so that passengers are informed of the change in capacity of the elevator car 10'**, but also that this change is having a positive impact as a result of reduced energy consumption, so that they might be more understanding or forgiving of any reduced capacity.

Thus, the mass of the elevator counterweight 2' is varied during operation according to the expected needs of the elevator system 1', under the control of the controller 14', as described above. In the example of FIG. 3-5, this is done using a retractable detachment system 12', which includes two attachment mechanisms 34' which are each selectively retractable into the hoistway wall 36'. It will be appreciated that this is just one example detachment system 12'.

FIG. 3 shows the elevator system 1' in a configuration in which the elevator car 10' contains a load 16' with a large mass, and therefore the second part 6' is attached to the first part 4' as part of the elevator counterweight 2'. In FIG. 3, the elevator car 10' is located at the top of the elevator hoistway 24', adjacent to the second floor landing **28*d*', and correspondingly the elevator counterweight 2' is located at the bottom of the elevator hoistway 24'**, above the pit.

In FIG. 4, the elevator car 10' has moved to be at the ground floor landing **28*b*'. With the elevator car 10' in this position, the elevator counterweight 2' is positioned adjacent to the detachment system 12'. In FIG. 4 the attachment mechanisms 34' are retracted within the hoistway wall 36'. The second part 6' is still attached to the first part 4', however the load 16' in the elevator car 10' is now only a low mass, therefore the full duty load capacity is not required. Therefore, the controller 14' can control the detachment system 12' to detach the second part 6' from the elevator counterweight 2'. Accordingly, the attachment mechanisms 34' are controlled to protrude from the hoistway wall 36', and engage with the second part 6', e.g., to hook into it, so that the rest of the elevator counterweight 2' can move away without the second part 6'. The second part 6' is then stored by the detachment system 12' whilst the operation of the elevator system 1' continues without it, as shown in FIG. 5. Therefore, the detachment system 12' in this example also provides the parking location 26', which is on the hoistway wall 36'. In FIG. 5 the elevator counterweight 2' has moved upwards, without the second part 6', and the elevator car 10' has moved downwards in the hoistway 24' to be adjacent to the −1 landing 28*a*'**.

Figure 6:
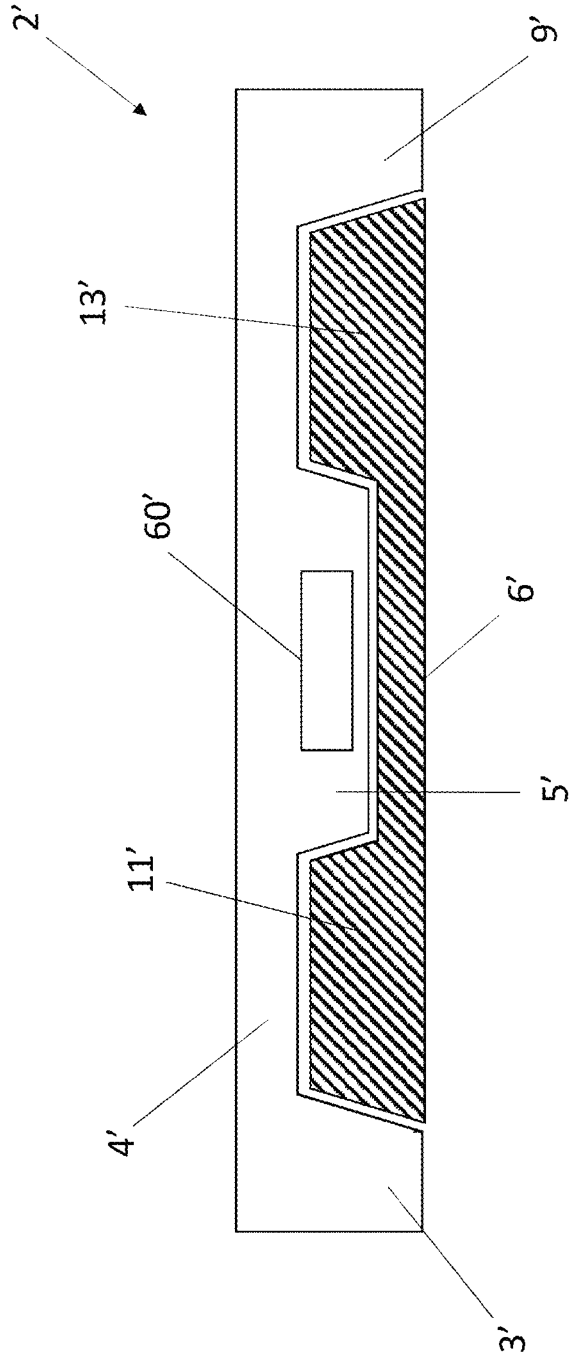
FIG. 6 is a view from above showing the elevator counterweight of FIGS. 3 to 6, according to a second example of the present disclosure.

FIG. 6 is a view from above showing the elevator counterweight 2' of FIGS. 3 to 5. The elevator counterweight 2' includes the first part 4', and the second part 6'. The first part 4' further includes a pulley 60', which enables connection of the first part 4' to the suspension member 8', shown in FIG. 3. The first part 4' and the second part 6' are both symmetrical in a side-side direction, i.e., the left side is symmetrical with the right side as seen in the Figure. This ensures side to side balance regardless of whether the second part 6' is attached or detached. The elevator counterweight 2' may run on guiderails which are typically located to the sides (to the left and right in the figure). Ensuring the same balance regardless of whether the second part 6' is attached or detached means that friction and noise and braking ability are not adversely affected by the state of the elevator counterweight 2'. In addition, it can be seen that both the first part 4' and the second part 6' have projections that extend across the mid-line of the elevator counterweight 2' in a front-back direction. For example the first part 4' has an 'M' shape with a left projection 3', a mid-projection 5', and a right projection 9', while the second part 6' has a 'U' shape nested into the 'M' with a left projection 11' located between the left and mid projections 3', 5' of the first part 4' and a right projection 13' located between the mid and right projections 5', 9' of the first part 4'. These projections ensure that each of the first part 4' and the second part 6' have part of their mass on the front side of the centre of mass of the elevator counterweight 2' and part of their mass on the back side of the centre of mass of the elevator counterweight 2'. The front and back mass distributions can be designed to be evenly distributed either side of a plane joining the two guiderails (i.e., a vertical plane perpendicular to the page of the figure and running horizontally through the elevator counterweight 2' as shown in the figure). In this way, the centre of mass of the first part 4' may be vertically aligned with the centre of mass of the second part 6' (meaning that one lies vertically directly above the other or they are coincident). With such an arrangement, attachment or detachment of the second part 6' from the first part 4' will not move the centre of mass of the elevator counterweight 2' in the horizontal plane and therefore will not adversely affect the friction, noise or braking of the elevator counterweight 2' during use. It should be appreciated that FIG. 6 is not drawn to scale, but shows the general principle of the mass distribution.

Figure 7:
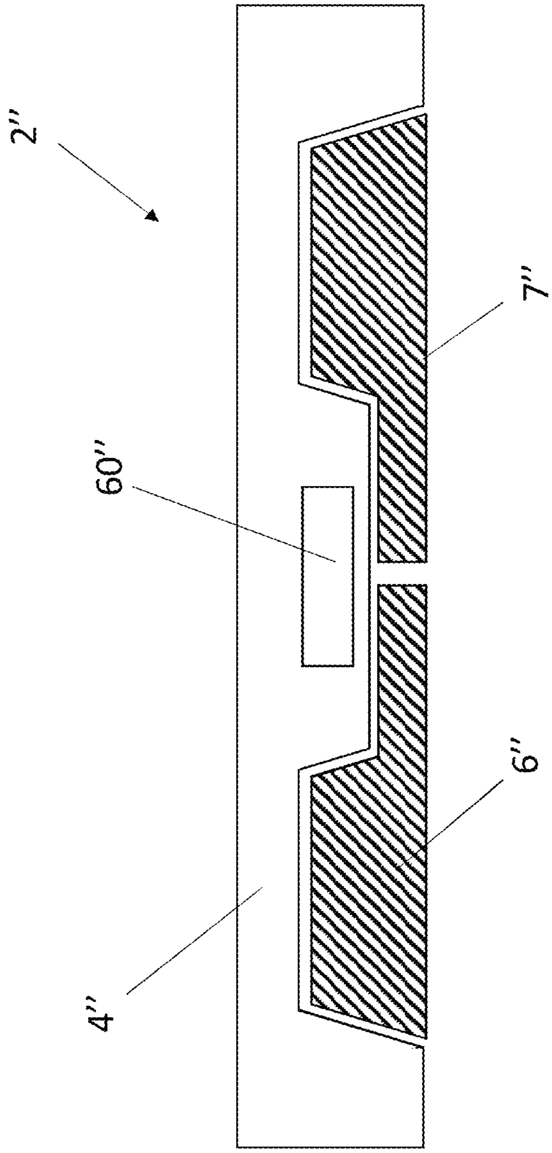
FIG. 7 is a view from above showing an elevator counterweight according to a third example of the present disclosure.

FIG. 7 is a view from above showing an elevator counterweight 2" according to a third example of the present disclosure, which can be used in accordance with the example elevator systems described above. The elevator counterweight 2" again includes a first part 4", connectable to a suspension member, and a second part 6", which can be detached from and reattached to the first part 4". The first part 4" further includes a pulley 60", which enables connection of the first part 4" to a suspension member. The elevator counterweight 2" further includes a third part 7" which is also detachable from and reattachable to the first part 4". This allows the mass of the elevator counterweight 2" to be varied in smaller degrees, e.g., rather than just having a maximum load and a partial mass, there are multiple degrees of partial mass which the elevator counterweight 2" can provide. It will be understood that these can correspond to multiple different modes of operation, e.g., varying degrees of "eco-mode".

Figure 8:
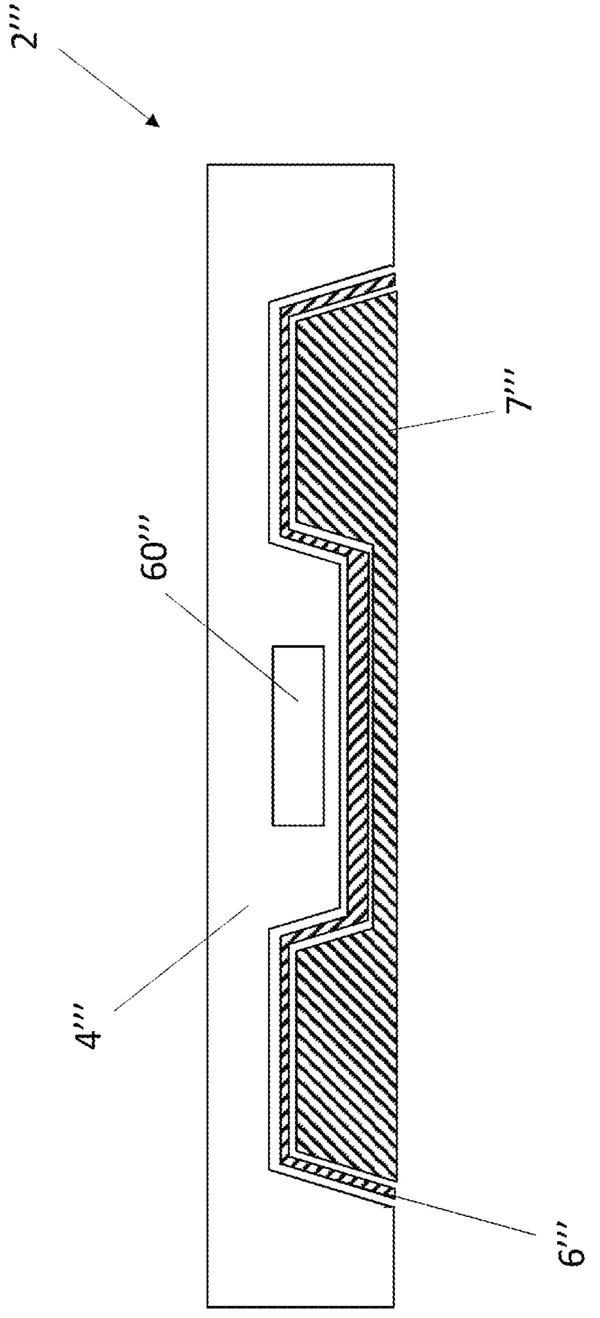
FIG. 8 is a view from above showing an elevator counterweight according to a fourth example of the present disclosure.

FIG. 8 is a view from above showing an elevator counterweight 2''' according to a fourth example of the present disclosure, which can be used in accordance with the example elevator systems described above. As with the elevator counterweight 2" of FIG. 7, the elevator counterweight 2''' includes a first part 4''', connectable to a suspension member, a second part 6''' and a third part 7'''. The first part 4''' further includes a pulley 60''', which enables connection of the first part 4''' to a suspension member. The second part 6''' is nested within the first part 4''' and can be detached from and reattached to the first part 4'''. The third part 7''' is nested within the second part 6''' and can be detached from and reattached to the second part 6''' and/or the first part 4'''. This allows the weight of the elevator counterweight 2''' to be varied in smaller degrees, as with the elevator counterweight 2" of FIG. 7. In this case the nesting arrangement of the parts 4''', 6''', 7''' advantageously means that each is symmetrical about the centreline (i.e., the left side is symmetrical to the right side as seen in the figure) so that regardless of how many of the parts 4''', 6''', 7''' are attached, the mass distribution in a side-side direction is unaffected, providing a balanced arrangement. The three parts 4''', 6''', 7''' have the same mass distribution properties as are described above in relation to FIG. 6, namely in a side to side direction and a front to back direction such that each of the first part 4''', the second part 6''' and the third part 7''' have centres of mass that are vertically aligned and therefore attachment and detachment of the second and/or third parts 6''', 7''' does not cause movement of the centre of mass of the elevator counterweight 2''' in the horizontal plane.

FIG. 9 shows a third example of an elevator system 201, which includes a fifth example of an elevator counterweight 202, according to of the present disclosure. The elevator system 201 includes a motor 230, which drives movement of a suspension member 208. The suspension member 208 suspends an elevator counterweight 202, on one side of the motor 230, applying a torque $T_{CWT}$ in a first direction of rotation, and suspends an elevator car 210 on the other side of the motor 230, applying the torque $T_{CAR}$ in a second direction of rotation. The torque $T_{CAR}$ is proportional to the mass of the elevator car 210, added to the mass of a load 216 which is transported within the elevator car 210.

These components are located in a hoistway 224, the walls of which are not shown in FIG. 9. The arrangement of sheaves, and end-hitches which is used to suspend the elevator car 210 and the elevator counterweight 202 is not important to the present disclosure, and the various possible arrangements are well known in the art and will therefore not be described in detail here. For example, a 2:1 roping arrangement is shown in FIG. 1, but a 1:1 or other roping arrangement is equally viable.

In order that the mass of the elevator counterweight 202 might continue to match the sum of the elevator car mass and the elevator car load mass more closely throughout operation of the elevator system 201, the elevator counterweight 202 is arranged so that its mass is variable.

In particular, the elevator counterweight 202 comprises a first part 204, which comprises a container **204*a*, e.g., a tank, and a fixed mass 204*b*. The container 204*a* is detachable from and attachable to the fixed mass 204*b* in the same or similar manner as the first and second parts attach and detach in the examples given above. The container 204*a* is fillable with a fluid or fluid-like material 206, e.g., a large number of particles or granules. The fluid or fluid-like material 206** may be, for example, sand or water or a mixture of sand and water.

The fluid or fluid-like material 206 may be supplied via a supply system 207 located in the hoistway 224 and added to the container **204*a* through an inlet 203, and may be removed from the container 204*a* via an outlet 205. Together these may provide a mass variation system 212. The fluid or fluid-like material which has been output from the outlet 205 is removed from the hoistway 224 by a drain 209. Thus, the outlet 205 together with the drain 209** provide an exhaust system.

Thus, by adding or removing some of the fluid or fluid-like material 206 the mass of the elevator counterweight 202 can be adjusted.

The operation of the elevator system 201 is controlled by an elevator system controller 218, as represented by a dashed line connecting the elevator system controller 218 to the elevator car 210. This elevator system controller 218 is connected to a controller 214 (as shown with a dashed line) which in turn controls the mass variation system, which is made up of the supply system 207, the inlet 203 of the container 204, and the outlet 205 of the container 204, and optionally a detachment system (not shown) which attaches and detaches the container **204*a* from the fixed mass 204*b*, as represented by a dashed line from the controller 214 to each of these components. The elevator system controller 218 and controller 214 may operate in the same way as the elevator system controller 18, 18' and controller 14, 14' described above with respect to either of the first two examples. In particular, the elevator system 201 may use a cloud computing service as discussed in relation to FIG. 1**.

The elevator system controller 218 varies certain system parameters based on the mass of fluid or fluid-like material 206 that is contained within the container 204 of the elevator counterweight 202. For example, the threshold load which is used by the elevator system controller 218 to determine an overload condition of the elevator car 210 is varied based on variations in the mass of the elevator counterweight 202. The elevator car 210 further includes a dynamic display 220 which displays the current threshold load, i.e., the current duty load.

FIG. 10 is a schematic drawing showing an elevator system 201' according to a fourth example of the present disclosure. Like components of the elevator system have been labelled with the same labels as used above with reference to FIG. 9, but denoted with an additional apostrophe, e.g., 201' rather than 201.

Most components of this elevator system are the same as those shown in FIG. 9, and described above, and they therefore will not be described again. The mass variation system 212' of this elevator system 201' differs from that shown in FIG. 10. In particular, instead of including a separate supply system and drain, as shown in FIG. 9, the mass variation system 212' comprises a reservoir 207' located at a parking location 226' on the wall of the hoistway 224'. The reservoir 207' contains a supply 217' of fluid or fluid-like material, the reservoir 207' having a pumped output 213' and an input 215'. The parking location 211' is adjacent to the position of the elevator counterweight 202' when the elevator car 210' is located at a main floor of the elevator system 201', as described above with reference to earlier examples. In this position, the pumped output 213' of the reservoir 207' is located adjacent to, e.g., in fluid connection with, the inlet 203' of the container 204', and the input 215' to the reservoir 207' is located adjacent to, e.g., in fluid connection with, the outlet 205' of the container 204'. The inlet 203' and outlet 205' of the tank 204' and the input 215' and pumped output 213' of the reservoir 207' together are controlled by the controller 214', and provide a mass variation system 212'. The mass of the elevator counterweight 204' is varied by moving fluid or fluid-like material between the reservoir 207' and the container 204'.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. An elevator system, comprising:

an elevator car;

an elevator counterweight including a first part configured to be connected, in use, to a suspension member of an elevator system, wherein the first part is arranged to receive an additional mass when the first part is connected to the suspension member, such that a mass of the elevator counterweight can be varied;

a mass variation system, wherein the mass variation system is arranged to add additional mass to the first part and/or remove additional mass from the first part, so that a mass of the elevator counterweight can be varied;

a controller, wherein the controller is arranged to control the mass variation system to add or remove the additional mass from the first part of the elevator counterweight; and a dynamic display, wherein the dynamic display is arranged to display a current duty load, wherein the current duty load varies in correspondence with variation in the mass of the elevator counterweight.

2. The elevator system of claim 1, wherein the controller is arranged to carry out a learning process, comprising the controller receiving measurements, over a first time period, representative of a load within the elevator car, and then, after the first time period ends, either:

the controller determining a predicted schedule of the maximum load in the elevator car over time; or the controller sending the measurements representative of a load within the elevator car over the first time period to a cloud service, wherein the cloud service is configured to determine the predicted schedule of the maximum load in the elevator car over time, and send this predetermined schedule to the controller;

wherein the controller is arranged to control the mass variation system to vary the mass of the elevator counterweight according to the predicted schedule.

3. The elevator system of claim 2, wherein after the first time period ends, the controller continues to receive measurements representative of the load within the elevator car, and updates the predicted schedule based on these measurements received after the end of the first time period.

4. The elevator system of claim 1, wherein the controller is arranged to control the mass variation system to vary the mass of the elevator counterweight in response to a trigger from the elevator system.

5. The elevator system as claimed in claim 1, further comprising an elevator system controller arranged to control operation of the elevator system, wherein the control of the operation of the elevator system is adapted in correspondence with variations in the mass of the elevator counterweight.

6. The elevator system of claim 1, further comprising a hoistway, within which the elevator car is configured to travel, the hoistway comprising a parking location and wherein the elevator system is configured so that the additional mass is stored in the parking location when it has been removed from the elevator counterweight by the mass variation system.

7. The elevator system of claim 6, wherein the parking location is located on the hoistway wall, wherein the parking location is at a height in the hoistway which corresponds to a height of the elevator counterweight when the elevator car is positioned at a main floor of the elevator system, wherein the main floor of the elevator system is the floor of the elevator system at which the majority of incoming passengers arrive at the elevator system.

8. An elevator system comprising:

an elevator car;

an elevator counterweight including a first part configured to be connected, in use, to a suspension member of an elevator system, wherein the first part is arranged to receive an additional mass when the first part is connected to the suspension member, such that a mass of the elevator counterweight can be varied;

a mass variation system, wherein the mass variation system is arranged to add additional mass to the first part and/or remove additional mass from the first part, so that a mass of the elevator counterweight can be varied;

a controller, wherein the controller is arranged to control the mass variation system to add or remove the additional mass from the first part of the elevator counterweight; and at least one operation-mode display, wherein the operation-mode display is arranged to display an indication of an elevator mode of operation, wherein the mode of operation corresponds to a variation in the mass of the elevator counterweight.

9. The elevator system of claim 8, wherein the controller is arranged to carry out a learning process, comprising the controller receiving measurements, over a first time period, representative of a load within the elevator car, and then, after the first time period ends, either:

the controller determining a predicted schedule of the maximum load in the elevator car over time; or the controller sending the measurements representative of a load within the elevator car over the first time period to a cloud service, wherein the cloud service is configured to determine the predicted schedule of the maximum load in the elevator car over time, and send this predetermined schedule to the controller;

wherein the controller is arranged to control the mass variation system to vary the mass of the elevator counterweight according to the predicted schedule.

10. The elevator system of claim 9, wherein after the first time period ends, the controller continues to receive measurements representative of the load within the elevator car, and updates the predicted schedule based on these measurements received after the end of the first time period.

11. The elevator system of claim 8, wherein the controller is arranged to control the mass variation system to vary the mass of the elevator counterweight in response to a trigger from the elevator system.

12. The elevator system as claimed in claim 8, further comprising an elevator system controller arranged to control operation of the elevator system, wherein the control of the operation of the elevator system is adapted in correspondence with variations in the mass of the elevator counterweight.

13. The elevator system of claim 8, further comprising a hoistway, within which the elevator car is configured to travel, the hoistway comprising a parking location and wherein the elevator system is configured so that the additional mass is stored in the parking location when it has been removed from the elevator counterweight by the mass variation system.

14. The elevator system of claim 13, wherein the parking location is located on the hoistway wall, wherein the parking location is at a height in the hoistway which corresponds to a height of the elevator counterweight when the elevator car is positioned at a main floor of the elevator system, wherein the main floor of the elevator system is the floor of the elevator system at which the majority of incoming passengers arrive at the elevator system.

* * * * *